United States Patent
Nozue

(10) Patent No.: US 9,507,773 B2
(45) Date of Patent: Nov. 29, 2016

(54) TRANSLATION ASSISTANCE DEVICE, TRANSLATION ASSISTANCE SYSTEM, AND CONTROL METHOD FOR THE SAME

(71) Applicant: SUNFLARE CO., LTD., Tokyo (JP)

(72) Inventor: Suguru Nozue, Tokyo (JP)

(73) Assignee: SUNFLARE CO., LTD., Tokyo (JP)

( * ) Notice: Subject to any disclaimer, the term of this patent is extended or adjusted under 35 U.S.C. 154(b) by 208 days.

(21) Appl. No.: 14/410,527

(22) PCT Filed: Apr. 24, 2013

(86) PCT No.: PCT/JP2013/062141
§ 371 (c)(1),
(2) Date: Aug. 12, 2015

(87) PCT Pub. No.: WO2013/161914
PCT Pub. Date: Oct. 31, 2013

(65) Prior Publication Data
US 2015/0347398 A1 Dec. 3, 2015

(30) Foreign Application Priority Data

Apr. 25, 2012 (JP) .................................. 2012-100448

(51) Int. Cl.
*G06F 17/28* (2006.01)
(52) U.S. Cl.
CPC ......... *G06F 17/289* (2013.01); *G06F 17/2836* (2013.01)
(58) Field of Classification Search
CPC .......................... G06F 17/289; G06F 17/2836
See application file for complete search history.

(56) References Cited

U.S. PATENT DOCUMENTS

| 2003/0101044 | A1* | 5/2003 | Krasnov | G06F 17/2827 704/4 |
| 2003/0101046 | A1* | 5/2003 | Krasnov | G06F 17/2827 704/7 |
| 2003/0204400 | A1* | 10/2003 | Marcu | G06F 17/2735 704/251 |
| 2008/0162115 | A1* | 7/2008 | Fuji | G06F 17/2836 704/7 |
| 2009/0204389 | A1* | 8/2009 | Wang | G06F 17/289 704/7 |

(Continued)

FOREIGN PATENT DOCUMENTS

| JP | 08-000846 U | 5/1996 |
| JP | 08-329059 A | 12/1996 |

(Continued)

OTHER PUBLICATIONS

International Search Report; PCT/JP2013/062141; Oct. 8, 2013.

*Primary Examiner* — Brian Albertalli
(74) *Attorney, Agent, or Firm* — Studebaker & Brackett PC

(57) ABSTRACT

The translation assistance device is equipped with: a dictionary means storing dictionary data comprising terms in a specific language, and terms in another language corresponding to the terms in said specific language; a specification means specifying the selected range of a term to be searched for in a text containing the term; a search means searching for the longest full-string match corresponding to the term contained in the specified selected range using said dictionary data as the search target; and a display control means displaying the terms in the other language corresponding to the term matching in the search for the longest full-string match. The translation assistance device searches for the longest full-string match by searching the dictionary means using all characters in the selected range, and reducing the characters in the selected range one at a time from the head character if there is no match.

5 Claims, 12 Drawing Sheets

(56) References Cited

U.S. PATENT DOCUMENTS

| | | | |
|---|---|---|---|
| 2010/0008582 A1* | 1/2010 | Kim | G06F 17/2863 382/177 |
| 2011/0035207 A1* | 2/2011 | Abe | G06F 17/2735 704/2 |
| 2011/0054837 A1* | 3/2011 | Ikeda | G06F 3/0414 702/155 |
| 2012/0019538 A1* | 1/2012 | Abe | G09B 7/00 345/467 |
| 2012/0131451 A1* | 5/2012 | Abe | G06F 3/0488 715/260 |
| 2012/0232882 A1* | 9/2012 | Zhang | G06F 17/2827 704/2 |

FOREIGN PATENT DOCUMENTS

| | | |
|---|---|---|
| JP | H10-116288 A | 5/1998 |
| JP | 2005-332089 A | 12/2005 |

* cited by examiner

TRANSLATION ASSISTANCE DEVICE, TRANSLATION ASSISTANCE SYSTEM, AND CONTROL METHOD FOR THE SAME

TECHNICAL FIELD

The present invention relates to a translation assistance device, a translation assistance system, a method therefor, a recording medium therefor, and a program therefor. In particular, it relates to a translation assistance device that displays an original text and a translation text and makes a translation in an interactive manner, a translation assistance system, and control method for a translation assistance device or system.

BACKGROUND ART

A known conventional translation assistance system for assisting translation of an original text into a target language comprises keyword extraction means that extracts a plurality of keywords from the original text to be translated and displays a list of the plurality of extracted keywords, data input means for inputting translation terms that correspond to the plurality of extracted keywords, batch replacement means that performs batch replacement of only the keywords in the original text with the input translation terms in the target language, and display means that displays the original text with only the keywords replaced with the translation terms in the target language (Patent Literature 1).

Known types of search for a translation term for a keyword include forward search, backward search, partial match search, and perfect match search, for example. There is also known a program product capable of displaying a translation term that corresponds to a particular word when the cursor of the mouse comes close to the particular word (for example, Roboword 2010 manufactured by Cross Language Inc.).

CITATION LIST

Patent Literature

Patent Literature 1: Japanese Patent No. 3978678

SUMMARY OF INVENTION

Technical Problem

Consider a case of translating from Japanese to English, for example. A Japanese word has one or more corresponding English translation terms, and a set of a plurality of words or phrases, or a collocation (compound word), also has a corresponding English translation term. Typically, these cannot be searched for at the same time, and different types of search yield different search results.

For example, if the search keyword is "Zaisann", a plurality of candidates such as "asset", "fortune" and "property" hit. If the search keyword is "Chiteki Zaisann", "intellectual property" hits. If the search keyword is "Chiteki Zaisann Kannri", "intellectual property management" hits regardless of the search type. If the search keyword is "Zaisann Kannri", candidates such as "administration", "management of property", "property administration" and "property management" hit when the search type is the forward match search, and not only the candidates listed above but also "intellectual property management", which corresponds to "Chiteki Zaisann Kannri", probably hit when the search type is the backward match search.

As described above, the normal dictionary search cannot yield a desired result if both the search type and the search scope (the range of a word or phrase to be searched for) are not specified before the search. In particular, in the case where the forward match search is specified, any word with a prefix does not hit. In the case where the partial match search is specified, too many words often hit.

In the case of a collocation or compound word, which is composed of a plurality of two-character words coupled to each other, the English translation term often differs depending on the technical meaning of the collocation or compound word. Specifically, the English translation term may be composed of a gerund or past participle of a verb and a noun or composed of two nouns. Therefore, in many cases, not only translation terms for single words but also translation terms for compound words or collocations need to be registered. Furthermore, the same or similar collocation in the original language may have different translation terms in different technical fields.

In order to find such collocations in the search without fail, a plurality of search keywords needs to be input, and a plurality of search types needs to be adopted, so that a problem arises that the number of search steps increases. If the partial match search for a shorter word or phrase is adopted to obviate the trouble of inputting a plurality of search keywords and pursuing a plurality of types of search, a problem arises that the number of search hits increases as described above and the choice of an appropriate translation term is complicated.

Solution to Problem

The present invention is characterized by display controlling means that performs the full longest match search of a selected range (for example, a range of characters in an original text that is specified with a pointer and highlighted in reverse video) and displays a translation term as a result of the search of the selected range.

To solve the problems described above, a translation assistance device according to the present invention comprises: dictionary means that stores dictionary data including at least a word or phrase in a particular language and a word or phrase in another language that corresponds to the word or phrase in the particular language; specifying means that specifies a selected range for a word or phrase to be searched for in a document including the word or phrase to be searched for; searching means that performs a full longest match search of said dictionary data for a word or phrase included in said specified selected range; and display controlling means that displays a word or phrase in said another language corresponding to a word or phrase found in said full longest match search, wherein said full longest match search is to search said dictionary means for a full string of characters in the selected range, and if there is no match, the string of characters in said selected range is shortened on a one character by one character basis from the front thereof.

To solve the problems described above, preferably, in the translation assistance device according to the present invention, said searching means performs said full longest match search each time the selected range specified by said specifying means changes in units of character, and said display controlling means displays one or more translation term candidates matching to the selected range that is found in the full longest match search performed again.

To solve the problems described above, preferably, in the translation assistance device according to the present invention, said display controlling means displays up to a predetermined number of translation term candidates found in a plurality of searches.

To solve the problems described above, preferably, in the translation assistance device according to the present invention, said dictionary means stores a displayed translation term candidate selected as a translation term in association with the date and time when the translation term candidate is selected as a translation term, said searching means reads, from said dictionary means, said translation term and the date and time when said translation term is selected, and said display controlling means displays translation term candidates found in said full longest match search in order of the date and time of selection as a translation term with the latest selected translation term candidate displayed first.

To solve the problems described above, a translation assistance system according to the present invention is a translation assistance system in which a server and a client are capable of communicating with each other via a network, the translation assistance system comprising: dictionary means that stores dictionary data including at least a word or phrase in a particular language and a word or phrase in another language that corresponds to the word or phrase in the particular language; specifying means that specifies a selected range for a word or phrase to be searched for in a document including the word or phrase to be searched for; searching means that performs a full longest match search of said dictionary data for a word or phrase included in said specified selected range; and display controlling means that displays one or more translation term candidates that is a word or phrase in the another language that is found in said full longest match search, wherein said full longest match search is to search said dictionary means for a full string of characters in the selected range, and if there is no matching translation term candidate in said dictionary means, the string of characters in said selected range is shortened on a one character by one character basis from the front thereof.

To solve the problems described above, in a control program for a translation assistance system in which a server and a client are capable of communicating with each other via a network, the translation assistance system comprises dictionary means that stores dictionary data including at least a word or phrase in a particular language and a word or phrase in another language that corresponds to the word or phrase in the particular language, the control program makes said translation assistance system function as specifying means that specifies a selected range for a word or phrase to be searched for in a document including the word or phrase to be searched for, searching means that performs a full longest match search of said dictionary data for a word or phrase included in said specified selected range, and display controlling means that displays one or more translation term candidates that are a word or phrase in the another language that is found in said full longest match search, and said full longest match search is to search said dictionary means for a full string of characters in the selected range, and if there is no matching translation term candidate in said dictionary means, the string of characters in said selected range is shortened on a one character by one character basis from the front thereof.

Advantageous Effects of Invention

According to the translation assistance device, the translation assistance system and the program therefor according to the present invention, a translation can be efficiently made because a full longest match search can be made of a selected range of an original text for one or more translation term candidate that corresponds to a word or phrase in the selected range, and one or more translation term candidates can be displayed.

DESCRIPTION OF EMBODIMENTS

In the following, a preferred embodiment of the present invention will be described in detail with reference to the drawings.

Figure 1:
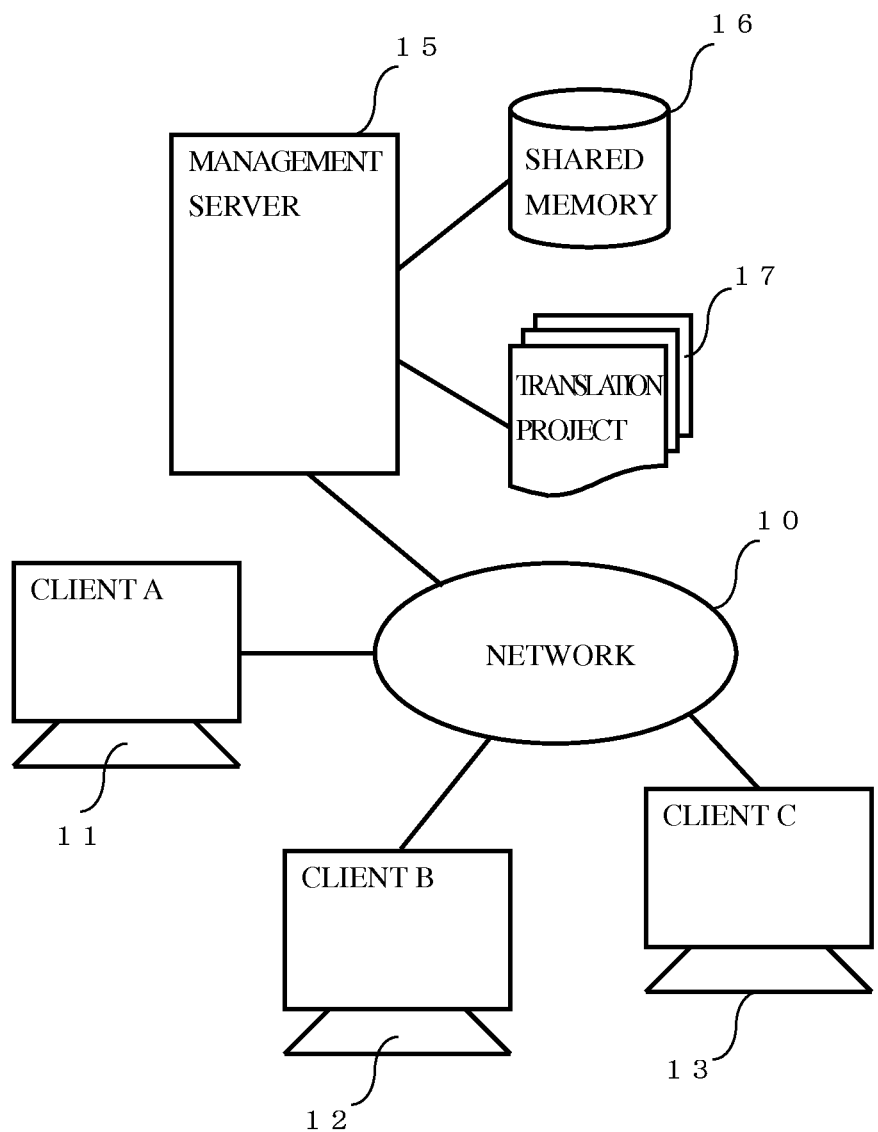
FIG. 1 is a schematic diagram showing a system configuration of a translation assistance system according to the present invention.

FIG. 1 is a diagram showing a system configuration of a translation assistance system.

(1) A client personal computer (such as a client A11, a client B12, or a client C13) of each translator connects to a management server 15 via a network 10, such as a LAN or the Internet, using client software (such as a dedicated client application or browser) installed in the client personal computer, and reads or updates memory information including dictionary data or an application program (including screen information for displaying a screen of a display screen application of each client) described later with reference to FIGS. 6 to 12 stored in a shared memory 16 in storage means (such as a hard disk 28) of the management server 15, or a translation file including an original text and a translation text stored on the basis of one or more translation projects 17.

(2) In response to a request from the client A11, for example, the management server 15 registers a translation file with the shared memory or a repository in a plurality of translation projects 17, or sends information from the repository to the client A11. The term "repository" used herein means a stockroom for data (the term "stockroom" is used here as a metaphorical expression of a logical data management section) and is used to centrally manage various kinds of information including a translation file of a particular translation project.

Figure 2:
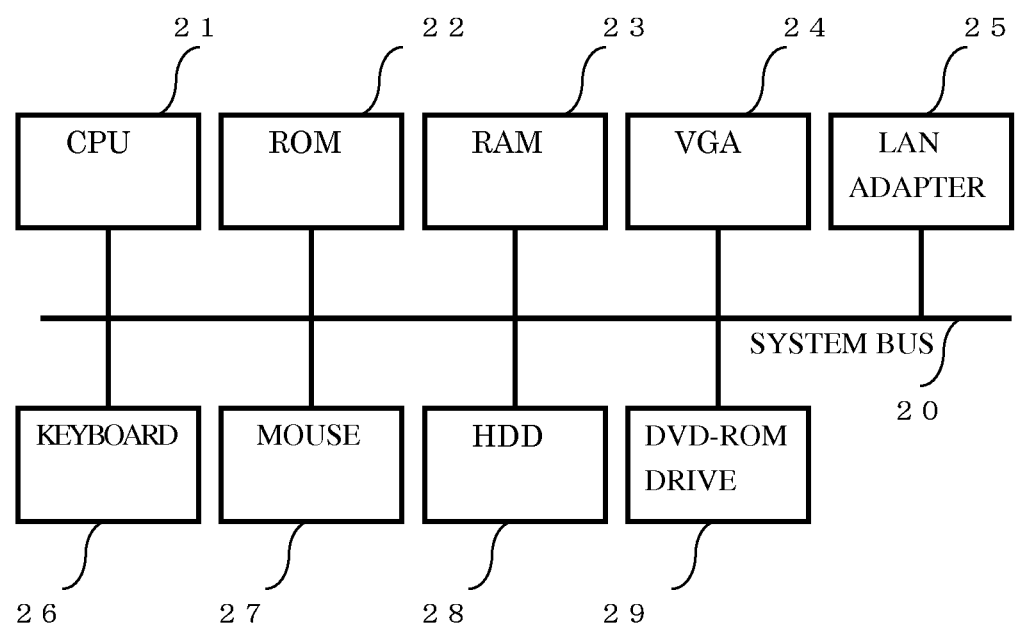
FIG. 2 is a schematic diagram showing a hardware configuration of a management server 15 and each client of the translation assistance system according to the present invention.

FIG. 2 is a diagram showing a hardware configuration of the management server 15 and the clients A11 to C13.

A CPU 21, a ROM 22, a RAM 23, a video graphics adapter (VGA) 24, a LAN adapter 25, a keyboard 26, a mouse 27, a HDD 28, and a DVD-ROM drive 29 are interconnected via a system bus 20.

Although not shown, an interface part may be provided between each of these components and the system bus 20. The CPU 21 controls the whole of the management server 15. More specifically, when the translation assistance system is activated, the CPU 21 reads a starting program (boot loader) from the ROM 22 to check and initialize the hardware, reads a system program from the HDD 28 and loads the system program into the RAM 23, and boots an operating system (OS). Furthermore, in response to a user's operation, the CPU 21 loads an application program from the HDD 28 into the RAM 23 and executes the application program.

As described above, the ROM 22 stores the starting program (boot program), and the RAM 23 is used as a so-called main memory and is used as a work area for the operating system and the application program. The VGA 24 is an adapter that is connected to a liquid crystal display or a CRT for screen display, and the LAN adapter 25 connects to an external network via radio or a LAN cable for data transmission and reception. The keyboard 26 and the mouse 27 serve as input means for inputting user operations. The HDD 28 stores various kinds of programs (such as the operating system, each of application programs for implementing the flowcharts shown in FIGS. 5 to 12 of the present invention, and layout information on an HTML screen to be displayed on a client screen), various kinds of tables, and search history information (such as search criteria information and detailed information on a search result). The DVD-ROM drive 29 is a drive for reading a DVD-ROM or DVD-R that stores various kinds of programs and is also capable of writing various kinds of data to a DVD-R. The DVD-ROM drive 29 may be a BD drive capable of reading and writing of a Blu-ray disk. This is the end of the description with reference to FIG. 2

Figure 3:
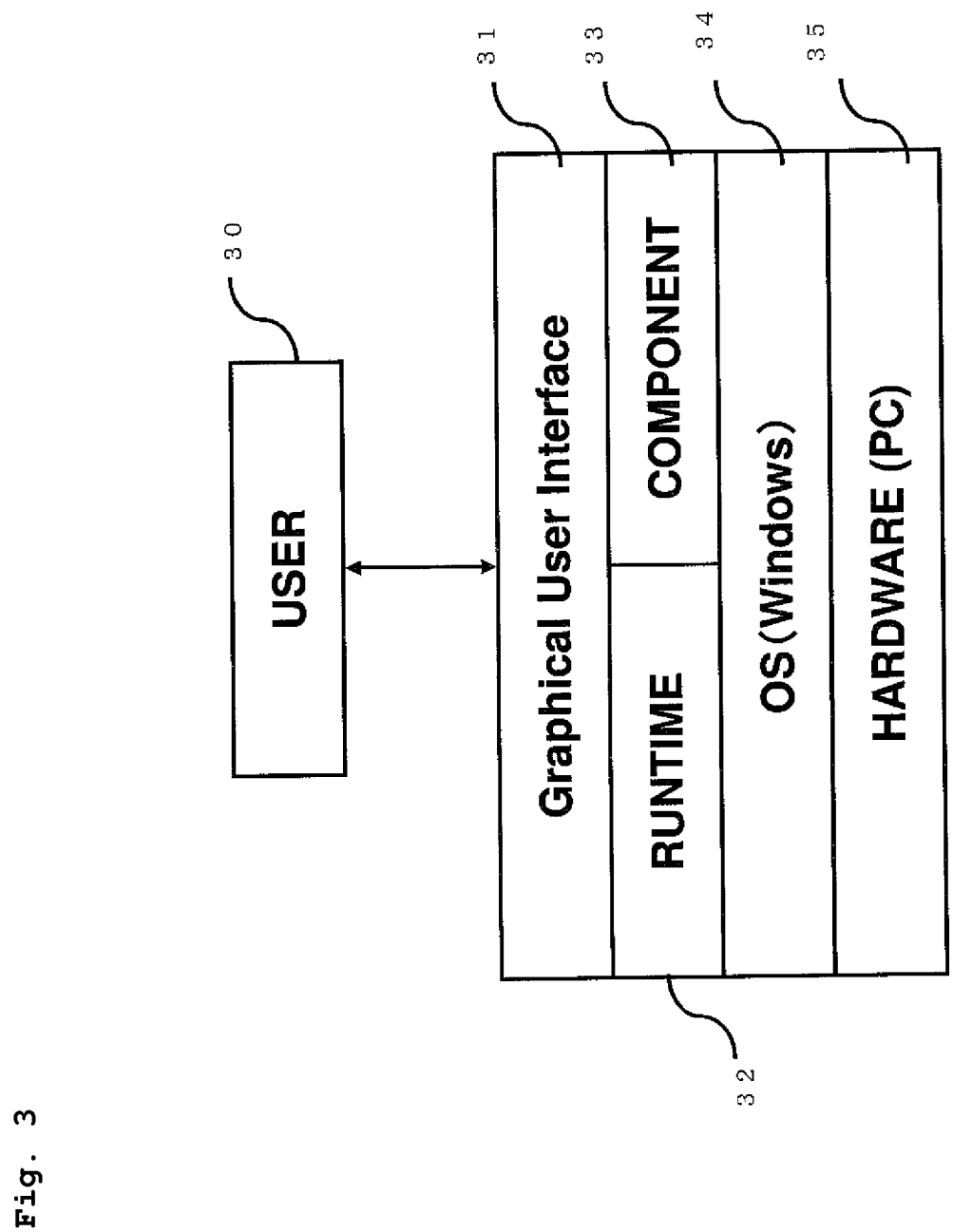
FIG. 3 is a schematic diagram showing a software configuration and hardware of each client of the translation assistance system according to the present invention.

FIG. 3 is a schematic diagram showing a software configuration and hardware of the clients A11 to C13.

An operating system 34 (OS 34), such as Windows®, is installed in storage means (such as the hard disk 28 or a flash memory not shown) of the hardware (including firmware) of each client personal computer. When the translation assistance system is activated, the operating system 34 is loaded to a main storage device of the personal computer, which is constituted by the RAM 23 (random access memory), for example, and executed under the control of the CPU 21 shown in FIG. 2. A runtime 32 is a part of an application program. In execution, the runtime 32 is loaded from the hard disk 28 or other storage means to the RAM 23 or other main storage device as required under the CPU 21's control.

A component 33 is a part of an application program that is loaded from the hard disk 28 or other storage means to the RAM 23 or other main storage device and resides in the main storage device for execution under the control of the CPU 21. A graphical user interface 31 (GUI 31) is a part of an application program for displaying a result of a processing in response to an input operation including a user's keyboard or mouse operation on a display or other output means. The graphical user interface 31 is loaded from the hard disk 28 or other storage means to the RAM 23 or other main storage device and operates in coordination with the component 33 and the runtime 32.

Figure 4:
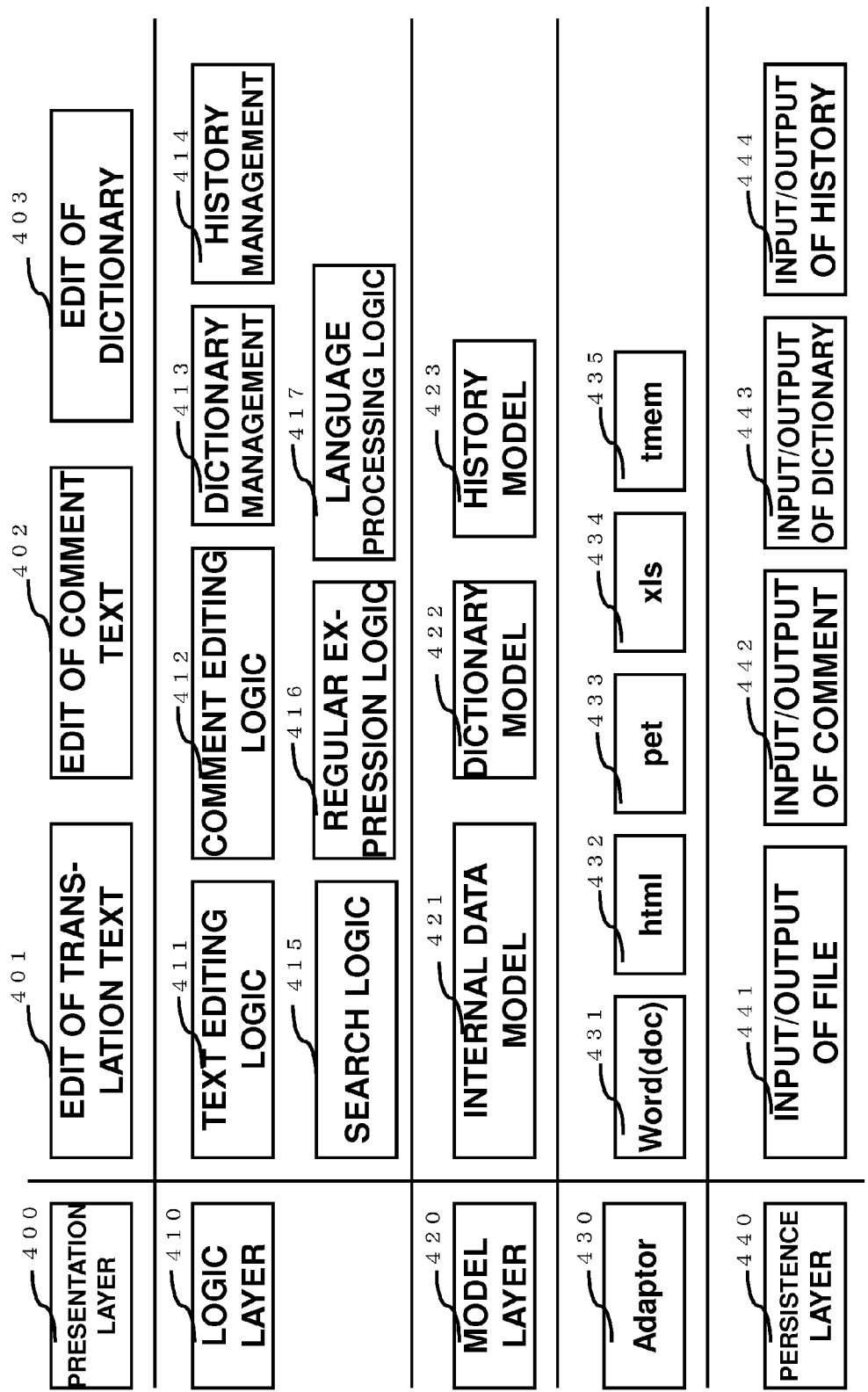
FIG. 4 is a schematic hierarchy chart showing an overview of the functionality of a translation assistance application program of the translation assistance system according to the present invention.

FIG. 4 is a schematic hierarchy chart showing an overview of the functionality of an application program of the translation assistance system according to the present invention.

A presentation layer 400 corresponds to the GUI in FIG. 3 and has a function of handling (delivery to a logic layer 410) of various kinds of input operations (including a press of a button, input of a text, a click in a check box and sliding of a slide bar, although not limited thereto) and a function of receiving a processing result from the logic layer 410 based on an input operation and outputting the processing result to a screen. The presentation layer 400 comprises a translation text editing part 401 that edits a translation text, a comment text editing part 402 that edits a comment text, and a dictionary editing part 403 that edits dictionary data.

The logic layer 410 is a layer that performs various kinds of processings based on the various kinds of input operations received from the presentation layer 400. The logic layer 410 comprises a document editing part 411 including a text editing logic that edits document data including an original text and a translation text, a comment editing part 412 including a comment editing logic that edits a translation comment, a dictionary managing part 413 including a dictionary management logic that manages dictionary data, a history managing part 414 including a history management logic that manages a history of updates of a document or comment by various logics in the logic layer, a searching part 415 including a search logic that searches dictionary data and document data, a regular expression part 416 including a regular expression logic for interpreting a regular expression during search, and a language processing part 417 including a language processing logic including a batch replacement of a translation text using the dictionary data and an attribute processing on a character basis, such as underlining, bold highlighting, superscripting or subscripting. A program shown in the flowcharts of FIGS. 6 and 7 described later corresponds to the logic layer 410.

A model layer 420 is a layer that defines a model of data (for example, a class of data or a data structure, the same holds true for the following description). The model layer 420 comprises an internal data model part 421 that defines a model of internal data including an internal variable, a dictionary model part 422 that defines a model of dictionary data (including a unique management number and a dictionary data item such as original language, part of speech, translation term, and technical field), and a history model part 423 that defines a model of history data.

An adapter 430 is a layer having a function of data format conversion. The adapter 430 comprises a software module 431 that performs data conversion of a Word file (doc file) created by Word manufactured by Microsoft Corporation, a software module 432 that performs data conversion of an html file, a software module 433 that performs data conversion of a pet file, which is a translation file in a data format specific to the present translation system, a software module 434 that performs data conversion of an Excel file (xls file) created by Excel manufactured by Microsoft Corporation, and a software module 435 that performs data conversion of tmem, which is a translation memory specific to the present system. The translation memory stores a term (including a word or phrase) in an original language, a translation term (including a word or phrase), the date and time of the last use (the date and time when a translation term was selected last time), and the date and time of new registration. If there is a plurality of translation terms registered for a single original word, the translation term selected most recently is displayed at the top of a drop-down list that contains one or more translation term candidates described later. In short, the drop-down list displays one or more translation term candidates in order of recent usage.

A persistence layer 440 performs actual inputting and outputting by referring to a required data model in the model layer 420 based on the result of processing by the logic layer 410 and the adapter. The persistence layer 440 corresponds to part of the runtime and the component shown in FIG. 2 and, specifically, invokes an input/output routine or input/output function of the OS to perform exchange of input and output data. The persistence layer 440 operates in coordination with the OS and firmware, in particular, a basic input output system (BIOS). The persistence layer 440 comprises a file input/output part 441 that performs input and output of a file including a translation text, a comment input/output part 442 that performs input and output of a comment, a dictionary input/output part 443 that performs input and output of dictionary data, and a history input/output part 444 that performs input and output of history data.

Figure 5:
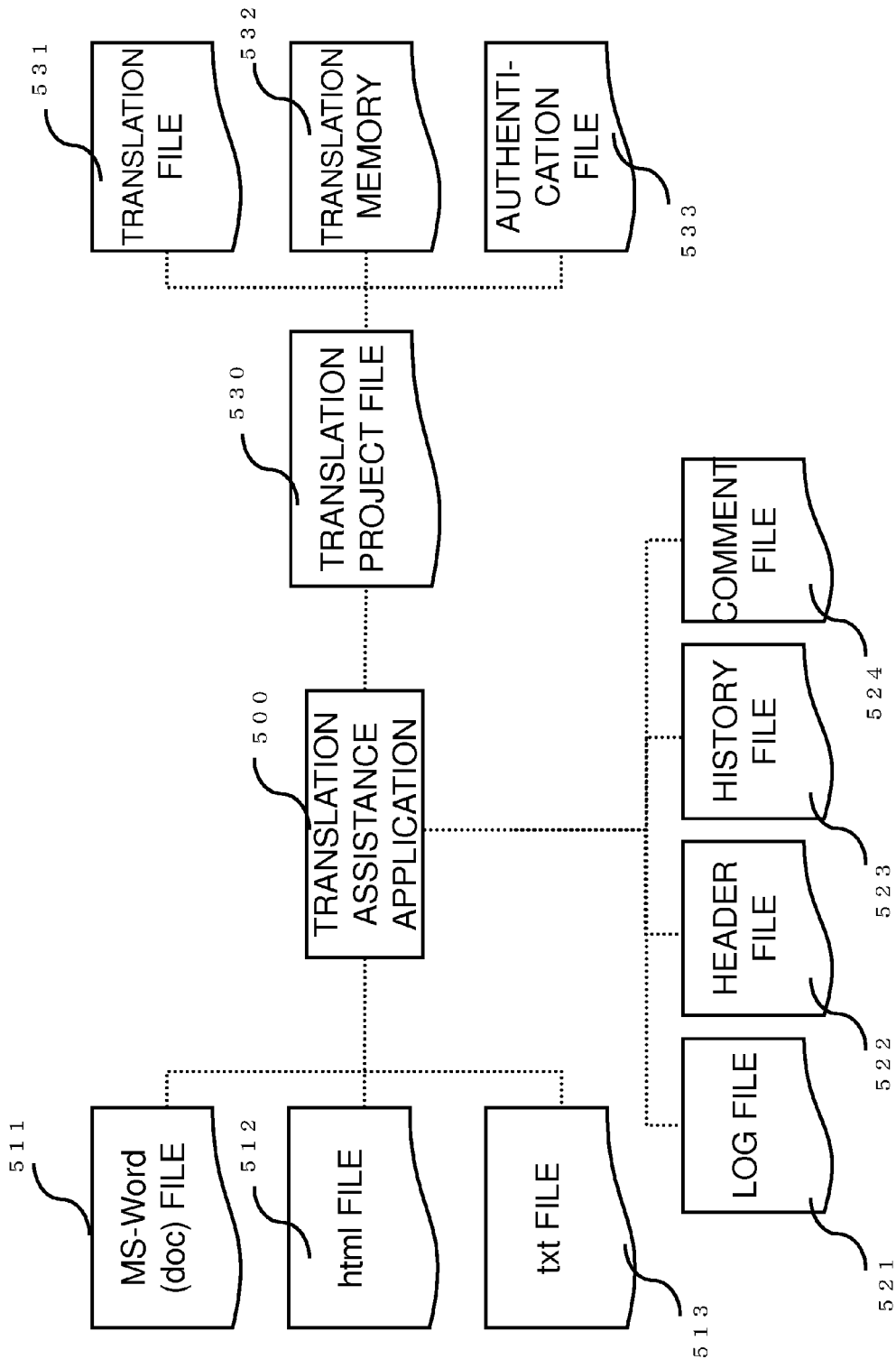
FIG. 5 is a schematic diagram showing a configuration of each file in the translation assistance system according to the present invention.

FIG. 5 is a schematic diagram showing a configuration of files. These files are stored in a translation project file of the management server 15 for each translation project 17.

(1) File formats that can be handled by the translation assistance system according to this embodiment include MS-Word (doc) 511, HTML 512, and text 513. Furthermore, the translation assistance system can handle other formats, such as Portable Document Format (PDF) manufactured by Adobe Systems Incorporated, and XML Pager Specification (XPF) format and Open Document Format (ODF) manufactured by Microsoft Corporation.

(2) A manuscript file captured by a translation assistance application 500 of the translation assistance system according to this embodiment can be saved in a translation project file 530 (.ppf) dedicated to this translation assistance system. The translation project file 530 comprises a "translation file 531 (.pet)" that retains a translation result including an original text and a translation text, a "translation memory 532 (.tmem)" that retains a translation memory, and an "authentication file 533 (.cfg)" for authentication.

(3) Furthermore, a log file 521 stores an ID of a user who has performed translation, the time when the translation was performed and the like. A header file 522 stores information on a header of a chapter or section of a translation text or the like. A history file 523 stores data on registration of a new translation term in the memory during translation or on batch replacement or normal individual replacement of a part of an original text with a translation term candidate read from the memory. A comment file 524 stores a translation comment or the like input during translation. These data can be read and displayed on a screen or printed out as required.

Figure 6:
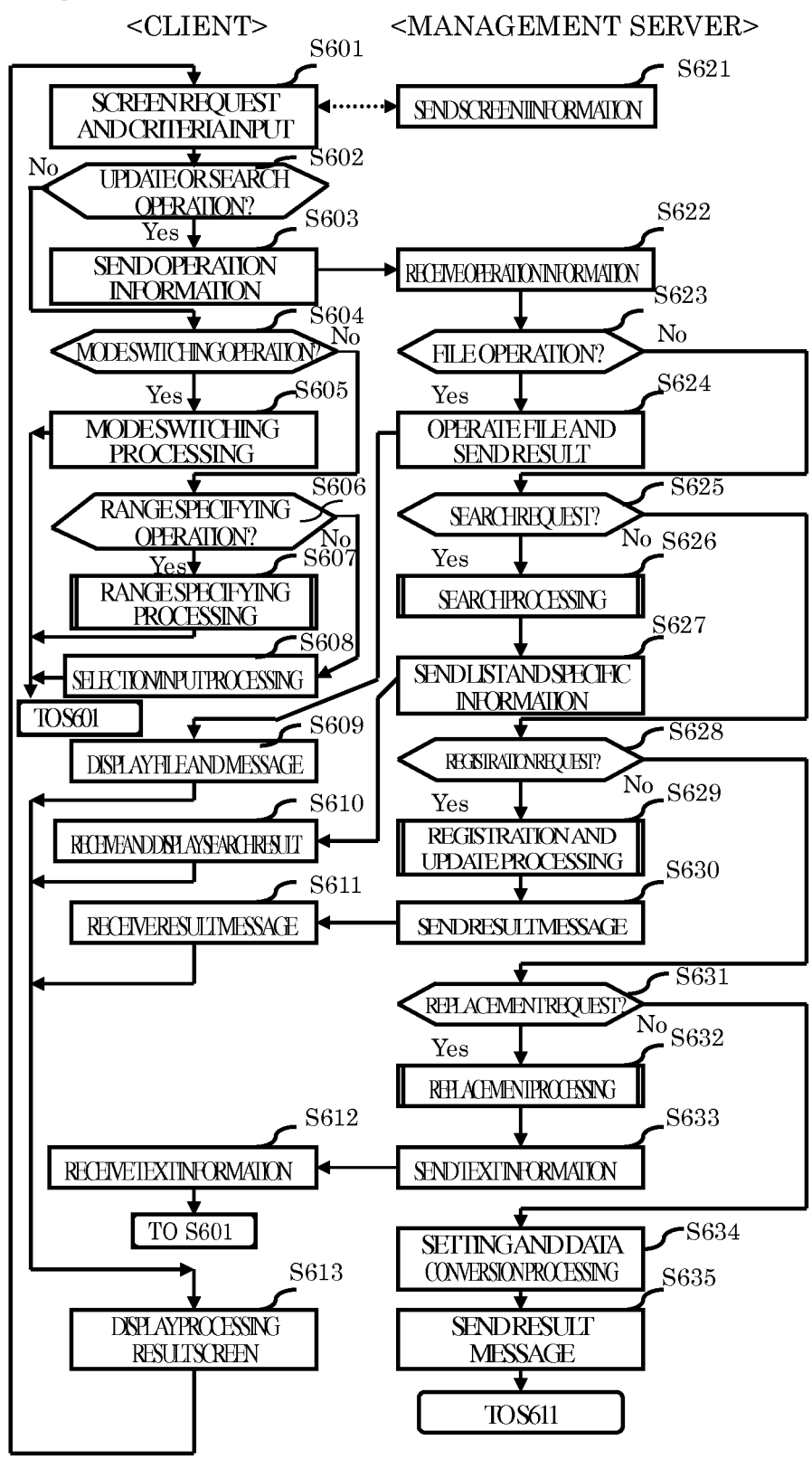
FIG. 6 is a general flowchart of a process performed by a client server translation assistance system according to an embodiment of the present invention.

FIG. 6 is a general flowchart of a process performed by a client server translation assistance system according to an embodiment of the present invention. As an example, a processing performed by the client A11 and the management server 15 will be described. In the flowchart of FIG. 6, it is assumed that an authentication processing has already been completed. The authentication processing is achieved as follows. The client A11 sends a user ID and a password to the management server 15. Then, the management server 15 refers to the authentication file 533 using the user ID received from the client A11 as a key, and compares the password paired with the user ID against the password received from the client A11 and stored in the work area of the RAM 23. If the passwords match to each other, the management server 15 determines that the user is authenticated, sends screen information on an initial screen corresponding to the user ID (screen information in html format for a screen of the client A11 to display an initial screen), reserves a session memory in the work area of the RAM 23 in the management server 15 and numbers the session memory with a session number, and stores the user ID and the session number in the session memory.

Any data exchanged between the management server 15 and the client A11 includes the session number. Thus, the client A11 of any request is identified using this session number before the end of the session, and the destination address is identified using this session number before data is sent to the client. If the passwords do not match to each other, the management server 15 sends a message to the client A11 to notify that the passwords do not match, and the authentication processing ends. Next, a process following the authentication processing will be described.

In FIG. 6, steps S601 to S613 are processings performed under the control of the CPU 21 of the client A11, and steps S621 to S635 are processings performed under the control of the CPU 21 of the management server 15. In this drawing, solid line arrows indicate a flow of control, and dashed line arrows indicate a flow of data. Double-headed arrows indicate a back-and-forth flow of data (the same holds true for the other flowcharts of FIG. 7 and the following drawings).

First, in step S601, the client A11 sends information to request for a screen for reading the translation file 531 to the management server 15. In response to this, in step S621, the management server 15 generates screen information for reading the translation file 531 (such as screen information in html format for displaying a list of translation files to which a log-in user of the client A11 can access, the screen information being read from the shared memory 16) from information read from file information (a list of translation file names) in the translation file 531 of the hard disk 28 of the management server 15 and file information (including information on translation files that can be read with the user ID) in the authentication file 533, sends the generated screen information to the client A11, proceeds to step S622, and waits for reception of operation information.

Again in step S601, if an operation (such as an event of pressing the left button of the mouse at a particular coordinate) of selecting a particular translation file 531 (specifically, an original text file to be translated) from the displayed list of translation files is detected, information for identifying the translation file selected at the coordinate at which the left button of the mouse is pressed and a request for reading the translation file are stored in the work area of the RAM 23 as operation information, a send flag, which is also stored in the work area of the RAM 23, is turned on, and the process proceeds to step S602.

In step S602, if the CPU 21 of the client A11 determines that the send flag is on, the process proceeds to step S603. In step S603, the client A11 sends the information for identifying the translation file and the request for reading the translation file to the management server 15 as operation information. In step S622, the management server 15 stores the received operation information in the work area of the RAM 23 of the management server 15, and the process proceeds to step S623.

In step S623, the CPU 21 of the management server 15 refers to the work area of the RAM 23, and if it is determined that the operation information indicates a file operation (an operation of requesting for reading of a translation file or an operation of requesting for file saving), the process proceeds to step S624. If it is determined that the operation information does not indicate a file operation, the process proceeds to step S625. In step S624, the selected translation file is loaded from the hard disk 28 to the work area of the RAM 23 and then sent to the client A11.

In step S609, the client A11 receives the translation file specified to be selected and a result message from the management server 15, stores the received translation file and result message in the work area of the RAM 23, and displays the result message on the screen, and then the process returns to step S601. In step S601, the translation file stored in the RAM 23 is displayed on the screen, and the process proceeds to step S602.

In step S602, in a state where the original text is read and at least a part of the original text is displayed in an original text window of the screen (such as a state where a horizontally elongated original text window is displayed in a lower part of the screen, and a horizontally elongated translation text window is displayed in an upper part of the screen), a sentence can be selected by pressing the Ctrl key and the W or Q key or a mouse button operation (such as an operation of pressing and holding the left button of the mouse to specify a start point of a selected range, dragging the mouse in the right direction, and releasing the left button to specify an end point of the selected range). If such a selection operation (the selected range specifying operation) occurs, the process proceeds to step S608 after it is determined No in step S604 and then it is determined No in step S606.

In step S608, a plurality of sentences can be selected. However, a TME mode cannot be entered in a state where sentences are selected across a paragraph mark or a sentence end mark (a state where the selected range extends over a plurality of paragraph ranges, or a state where the selected range includes a plurality of sentences and the end of the selected range does not coincide with a sentence end mark (such as "○" or ".")). In such a case, the selected range is modified so that the selected range ends at a paragraph mark or sentence end mark automatically, a transition request flag stored in the work area of the RAM 23 is turned on, and the modified selected range is displayed in a subsequent step S613. A selected character string or sentence and information that a selection flag is turned on are stored in the work area of the RAM 23, the process proceeds to step S601.

Again in step S602, if an event of pressing a space key (a mode switching operation) in the state where the selection flag is on is detected, the process proceeds to step S604, in which it is determined that the mode switching operation is detected, and then the process proceeds to step S605, in which the edit mode is changed to the TME mode, the changed edit mode is stored in the work area of the RAM 23. Then, the process returns to step S602 via step S601.

In step S602, if a press of a selected range specifying key (a "→" key, for example) is detected in the state where the processing mode is the TME mode, the process proceeds to step S606 after it is determined No in step S604.

In step S606, if a press of the selected range specifying key (for example, the left button of the mouse or the "→" key) in the TME mode is detected (if it is determined Yes in this step), the process proceeds to step S607. In step S607, a phrase/sentence selection controlling part performs a range specifying processing, stores the character string in the selected range and information for requesting for searching in the work area of the RAM 23, and turns on the send flag for searching the selected range, and the process returns to step S601. Then, the process proceeds from step S601 to step S602, in which it is determined that the send flag is on (it is determined that an update request operation or a search request operation has occurred: Yes), and the process proceeds to step S603.

In step S603, the operation information including the character string in the selected range and the search request is sent to the management server 15, and then the send flag is turned off. In step S622, the management server 15 receives the operation information, adds the operation information to the work area of the RAM 23, adds the character string in the selected range included in the operation information to history information 920, proceeds to step S625 after it is determined No in step S623, determines that it is the search request (Yes), and then proceeds to step S626.

In the following, details of step S626 and points associated therewith will be described with reference to the flowchart of FIG. 9. In the following description, steps shown in FIG. 6 corresponding to steps shown in FIG. 9 will also be described as required.

Step S901 is the same as steps S606 and S607 in FIG. 6 and therefore will not be further described. In step S902, using the character string in the selected range stored in the work area of the RAM 23 as a key, the history information 920 is referred to find a character string in a corresponding selected range, and the found character string is stored in another work area of the RAM 23. Then, the process proceeds to step S903, in which setting information 930 is referred to determine the search mode (in this case, a longest match search mode). Then, the process proceeds to step S904. Even if any character string in a corresponding selected range is not found in the history information 920 in step S902, the process also proceeds to step S903.

In steps S904 and S905, a full longest match search or forward longest match search or a regular expression search is performed (the full longest match search is performed in this example) by referring to a translation memory 940 in the search method according to the search mode determined using the character string in the selected range as a key, and then the process proceeds to step S906. In step S906, all memory items that meet the search criteria (matching memory items that are one or more translation term candidates) as a result of the search are stored (cached) in the work area of the RAM 23, and then the process proceeds to step S907.

In step S907, the cached matching memory items are rearranged in order of the date of last use, the date of last update, or the frequency of use, for example. Then, the process proceeds to step S908. In step S908 (which corresponds to step S627), a predetermined number of top translation term candidates (matching memory items) read from the translation memory are sent to the client A11. Furthermore, in step S908 (which also corresponds to step S610), the search result (the plurality of translation term candidates) is displayed on a TME window of the display screen of the client A11. If an operation of selecting a particular translation term candidate on the display screen of the client A11 (such as an operation of pressing the Enter key in the state where a particular row in the drop-down list is highlighted in reverse video) occurs or the escape key (Esc key) is pressed, the process proceeds to step S910. In step S910, it is determined whether or not the escape key (Esc key) is pressed. If the escape key is not pressed, the process proceeds to step S909 (which corresponds to step S601).

In step S909, the client A11 sends selected translation term information to the management server 15, and the management server 15 updates the date of last use or the frequency of use of the corresponding word or phrase in the translation memory 940 based on the received translation term information that allows identification of the selected translation term candidate in the translation memory 940. Then, the process proceeds to step S913. In step S913, if the escape key is not pressed, the process proceeds to step S911. In step S911, any relevant parts in the translation text that subsequently appear are replaced in a batch with the selected translation term candidate, and the history information 920 is updated with the selected translation term candidate. Then, the process proceeds to step S912, in which screen information for reflecting the replacement result in a translation term window is sent to the client.

The replacement processing described above can also be explained as follows with reference to FIG. 6. If a selection operation using the selected particular translation term candidate (such as an operation of pressing the Enter key in the state where the particular translation term candidate is highlighted in reverse video in the drop-down list) is detected in step S602, the process proceeds from step S602 to step S608 via steps S604 and S606. In step S608, a selection processing (a processing of storing translation term information for identifying the selected translation term in the work area of the RAM 23) is performed. Then, the process proceeds steps S601 and S602, and in step S603, the selected translation term information is sent to the management server 15. Then, the process proceeds to step S632 via steps S622, S623, S625, S628 and S631, and in step S632, a replacement processing is performed. Specifically, any relevant parts of the translation text that subsequently appears are replaced in a batch with the selected translation term candidate, the history file 523 is updated, and the process proceeds to step S633. In step S633, text information for updating a translation text display window is sent to the client A11. Then, in step S612, the client A11 receives the text information. Then, the process proceeds to step S613, in which the contents of the translation text display window is updated.

Referring to FIG. 9 again, if it is determined in step S910 or S913 that the Esc key is pressed on the client A11, the process proceeds to step S914, in which the operation information is sent to the management server 15, and in response to this, the management server 15 sends screen information for updating the screen of the client (in steps S629 and S630 in FIG. 6). In step S912, the screen of the client A11 is updated, and the drop-down list in the original text window disappears. This is the end of the description with reference to FIG. 9, and description will be made again with reference to FIG. 6. On the client A11, the process returns from step S611 to step S601.

If a new registration operation on the translation memory is detected in step S602, a registration processing on the translation memory 940 in the shared memory 16 is performed in steps S603, S622, S628 and S629. The translation term candidate newly registered in the translation memory 940 is displayed at the top of the hit translation term candidates in the drop-down list in the next search (at least until another translation term candidate is selected).

A setting and data conversion processing in step S634 means a processing of updating, at the end of translation, the translation file 531 with the log file 521, the header file 522, the history file 523 and the comment file 524 updated during translation, a priority setting processing of setting the priority among the translation memories 940 in the case where there is a plurality of translation memories 940, various setting processings such as a processing of setting the search mode, and various data conversion processings performed by the adapter 510. Following these various processings, the process proceeds to step S635, in which a result message is sent to the client A11. Then, on the client A11 waiting for the result information, the process proceeds to step S611. This is the end of the description with reference to FIG. 6.

Figure 7:
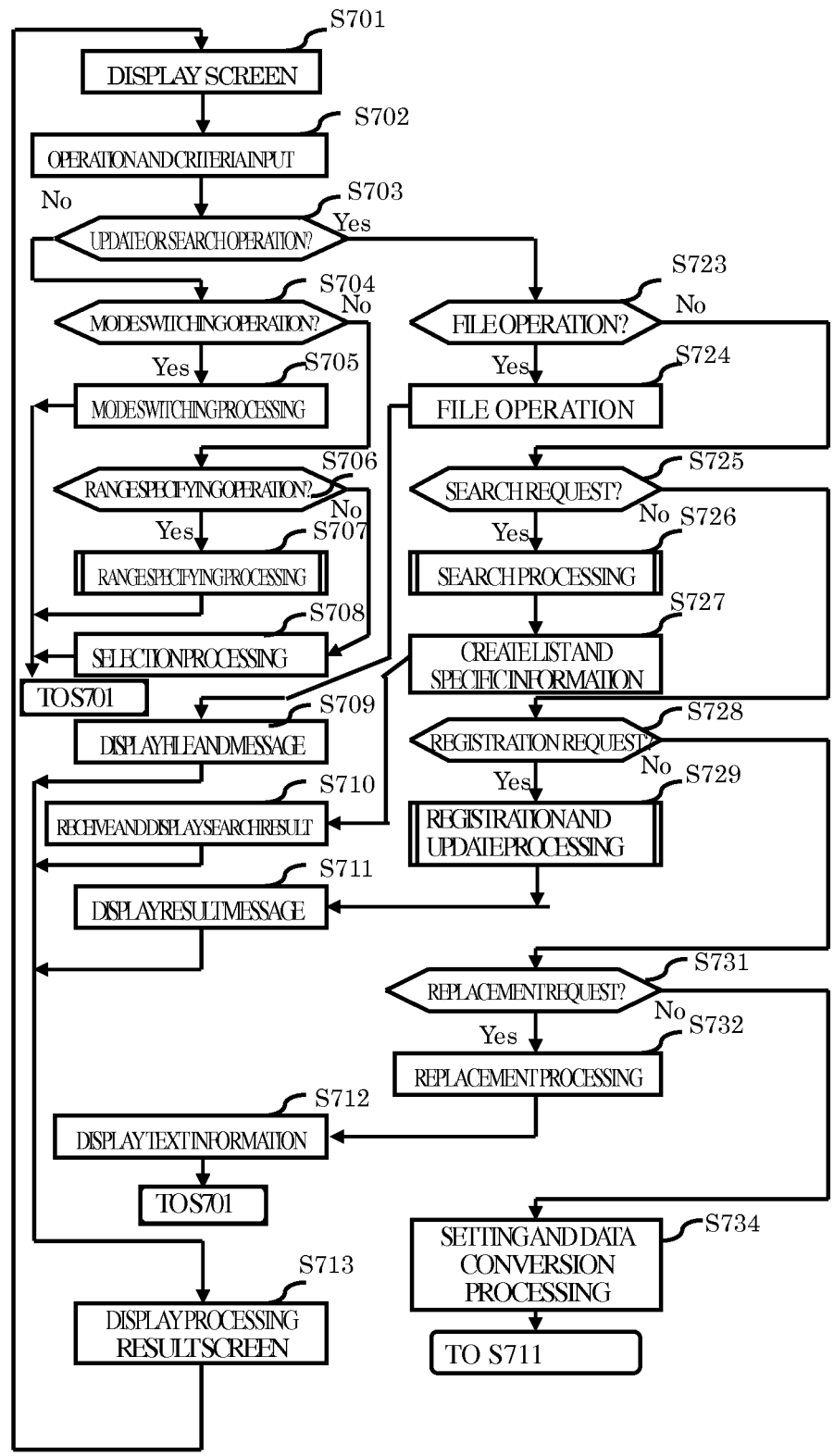
FIG. 7 is a general flowchart of a process performed by a stand-alone translation assistance system according to an embodiment of the present invention.

FIG. 7 is a general flowchart of a process performed by a stand-alone translation assistance device according to an embodiment of the present invention. The process shown in FIG. 7 is basically the same as the process shown in FIG. 6 (for example, step S701 is the same as step S601) except that the process shown in FIG. 7 does not include the steps of information exchange between the client and the server (such as steps S630 and S635 of sending the result message and step S611 of receiving the result message in FIG. 6) since the process shown in FIG. 7 is completely performed by a single PC, for example, so that description of the process shown in FIG. 7 will be omitted.

Figure 8:
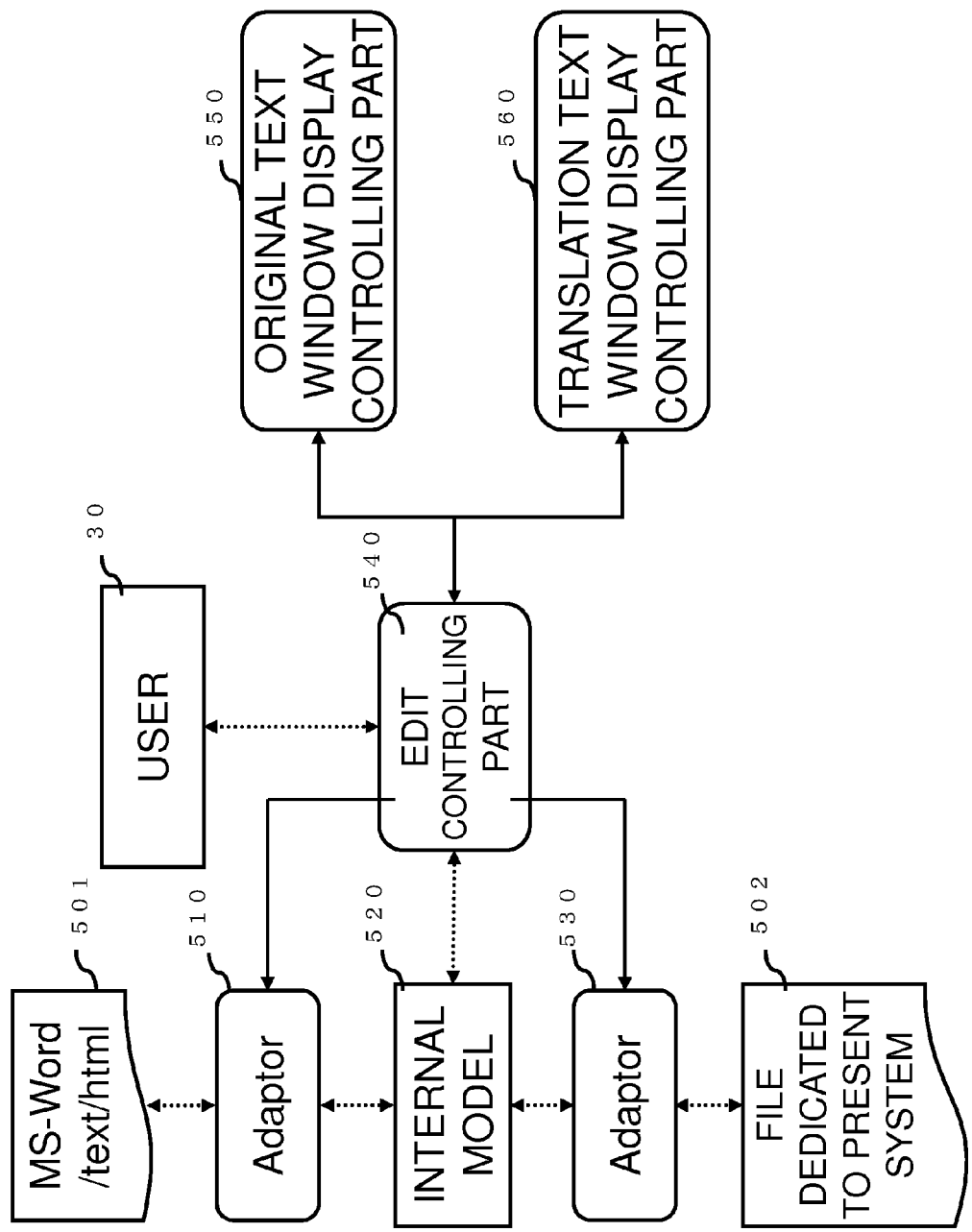
FIG. 8 is a schematic diagram illustrating details of a parallel edit process for an original text and a translation text.

FIG. 8 is a schematic diagram illustrating details of a parallel edit process for an original text and a translation text, which corresponds to a part of step S629 in FIG. 6 and step S729 in FIG. 7. The term "parallel edit process" used here does not mean that the original text and the translation text are simultaneously edited but means that both the original text and the translation text are displayed (in their respective windows, for example), and a desired one of the texts can be edited in a series of operations.

During the parallel edit process, the display screen shows an original text window and a translation text window based on the screen information (screen layout information) read from the shared memory 16.

(1) An edit controlling part 540 detects an input on the keyboard 26 or an operation of the mouse 27, determines if it is an edit operation or input to the original text window, an edit operation or input to the translation text window, or a data conversion operation that instructs reading or saving of external data based on the details of the operation or information on the position of the cursor of the mouse 27, and makes the adapter 510 perform the data conversion processing or performs various edit processings according to the input or operation.

(2) If it is determined that the operation is an operation that instructs reading of external data, the MS-Word file 511, the HTML file 512, the text file 513 and the like are converted into an internal model 520 by the data conversion function of the adapter 510 via the edit controlling part 540 that detects an input that instructs conversion of read data from the keyboard 26 or mouse 27. Furthermore, the internal model 520 is converted into a dedicated file 502 for the translation assistance system by the data conversion function of the adapter 530 via the edit controlling part 540 that detects an input that instructs saving from the keyboard 26 or mouse 27, and the dedicated file 502 is saved as a part of the translation project file 17 in the hard disk 28.

(3) In the parallel edit mode, the edit controlling part 540 determines whether the current operation is an edit operation (an input operation or a modification operation such as deletion or insertion) to the original text window or the translation text window, reflects any modification in the internal model (performs an update corresponding to the operation) regardless of whether the original text or the translation text is modified, and reflects the result of the edit operation in the original text or the translation text to update the display of an original window display controlling part 550 or a translation text window display controlling part 560.

Figure 9:
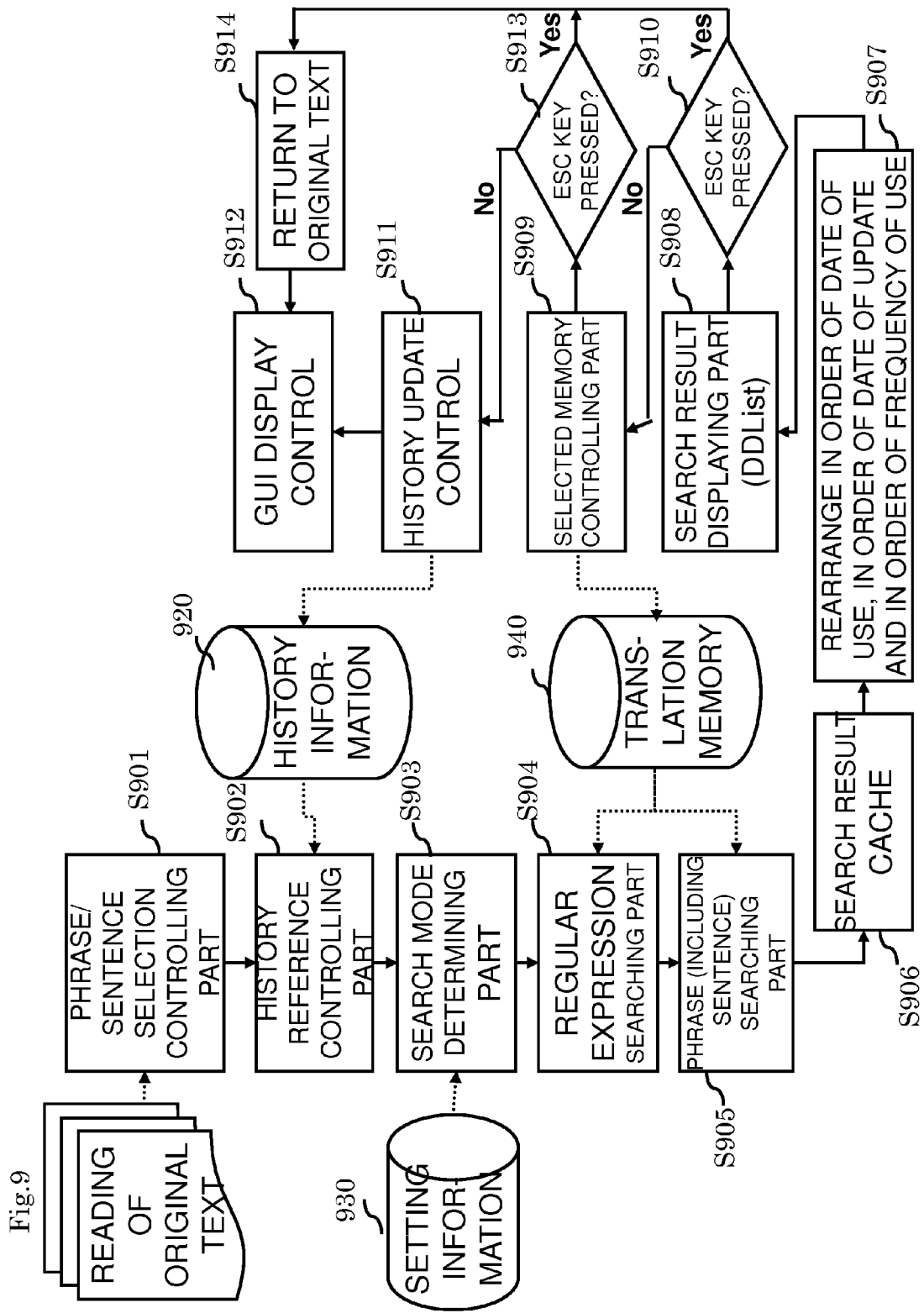
FIG. 9 is a flowchart illustrating details of a search processing in step S626 in FIG. 6.

FIG. 9 is a flowchart illustrating details of the selection processing for a search part, the search processing, the result display processing, and the update processing in the TME operation mode of the edit controlling part. The TME operation mode is a mode in which a translation term for a word in the original text (original word) is selected, the selected translation term is registered, and the word or phrase (including a part of a word, a word and a phrase) in the original text is replaced with the selected translation term. If a word or phrase in the original text is replaced with a translation term, the same word or phrase that appears in the subsequent part of the original text is also replaced with the same translation term, although the batch replacement does not cover the entire document, and the same word or phrase that appears in the preceding part of the original text is not replaced. Therefore, an original word can be replaced with another translation term from a certain point in the original text or separately replaced with another word out of the TME operation mode. The search mode used in the search is stored in the setting information 930 in advance. The search mode has already been described in detail with reference to the flowchart of FIG. 6 and therefore will not be further described.

Figure 10:
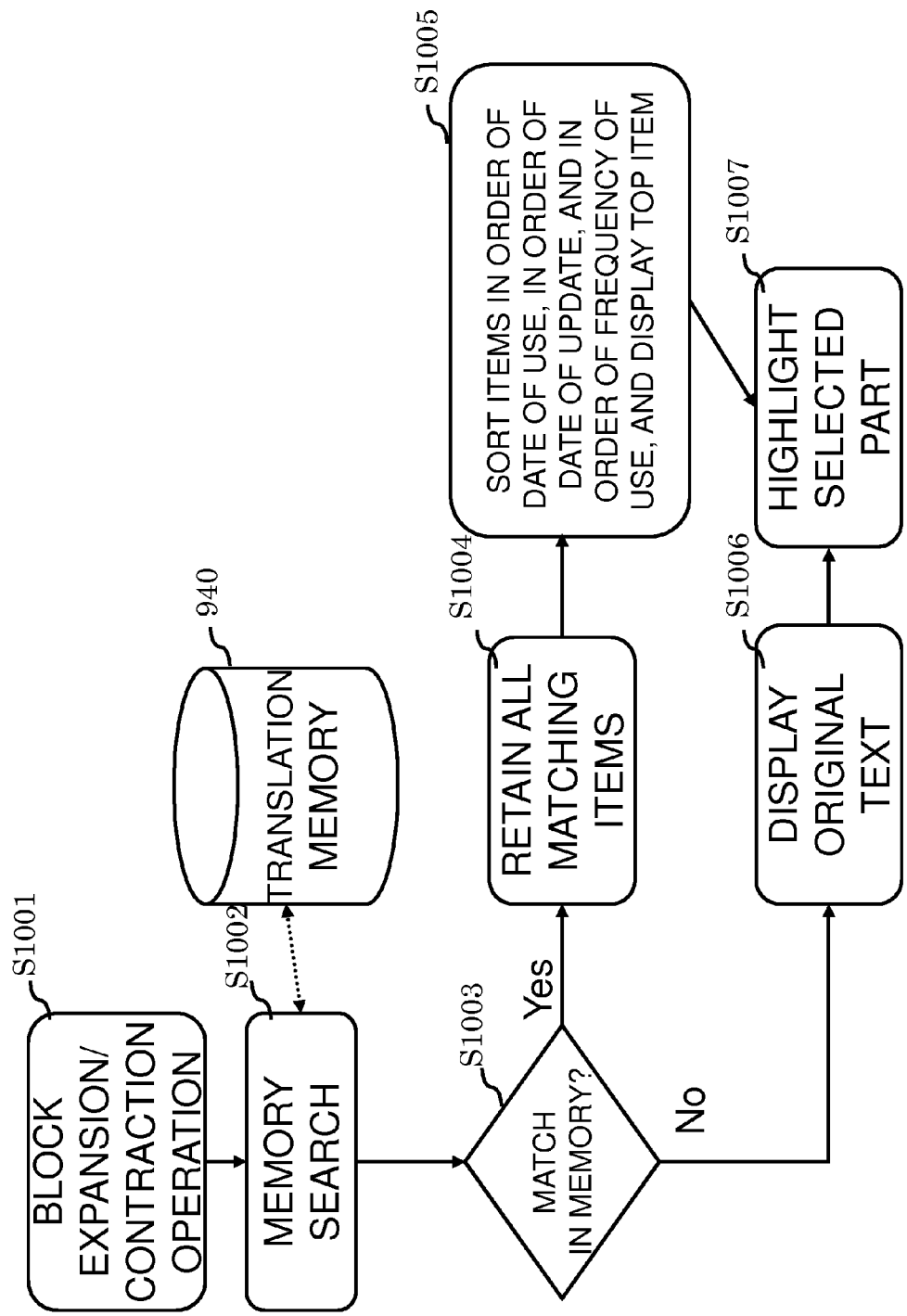
FIG. 10 is a flowchart illustrating details of a block expansion/contraction processing in a TME mode.

FIG. 10 is a flowchart illustrating details of a block expansion/contraction processing in the TME mode.

In step S1001, if the client A11 detects in the TME mode that an operation of pressing the Shift key and the → or ← key or pressing the Ctrl key and the → or ← key is performed, the client A11 sends the operation information (information on the characters in the selected range and that the range specifying operation has been performed) to the management server 15, the management server 15 stores the operation information in the work area of the RAM 23, and then the process proceeds to step S1002. In step S1002, memory search is performed using a character in the selected range as a key. Thus, the search range can be adjusted depending on the selected range. The search result is stored in the work area of the RAM 23, and the process proceeds to step S1003.

After that, each time the selected range is adjusted, the translation memory is searched again, and one or more translation term candidates that match to the keyword are stored in the work area of the RAM 23. In step S1003, it is determined whether there is a matching item in the translation memory, and if there is a matching item, the process proceeds to step S1004.

If it is determined in step S1003 that there is no matching item, the process proceeds to step 1006. In step S1004, information on the matching item stored in the work area of the RAM 23 is retained, and the process proceeds to step S1005. In step S1005, if there is a plurality of matching translation terms, the management server 15 sorts the translation terms in order of the date of use, in order of the date of update, and then in order of the frequency of use, and sends information on the sorted translation terms to the client A11, and the client A11 displays the top item of the received translation terms. Then, the process proceeds to step S1007. In step S1007, the characters in the selected range are highlighted, and the process ends. If it is determined in step S1003 that the translation memory 940 contains no memory item that matches to the word in the selected range, the process proceeds to step S1006, in which the original text is displayed without change in a TME window, and the process ends.

Figure 11:
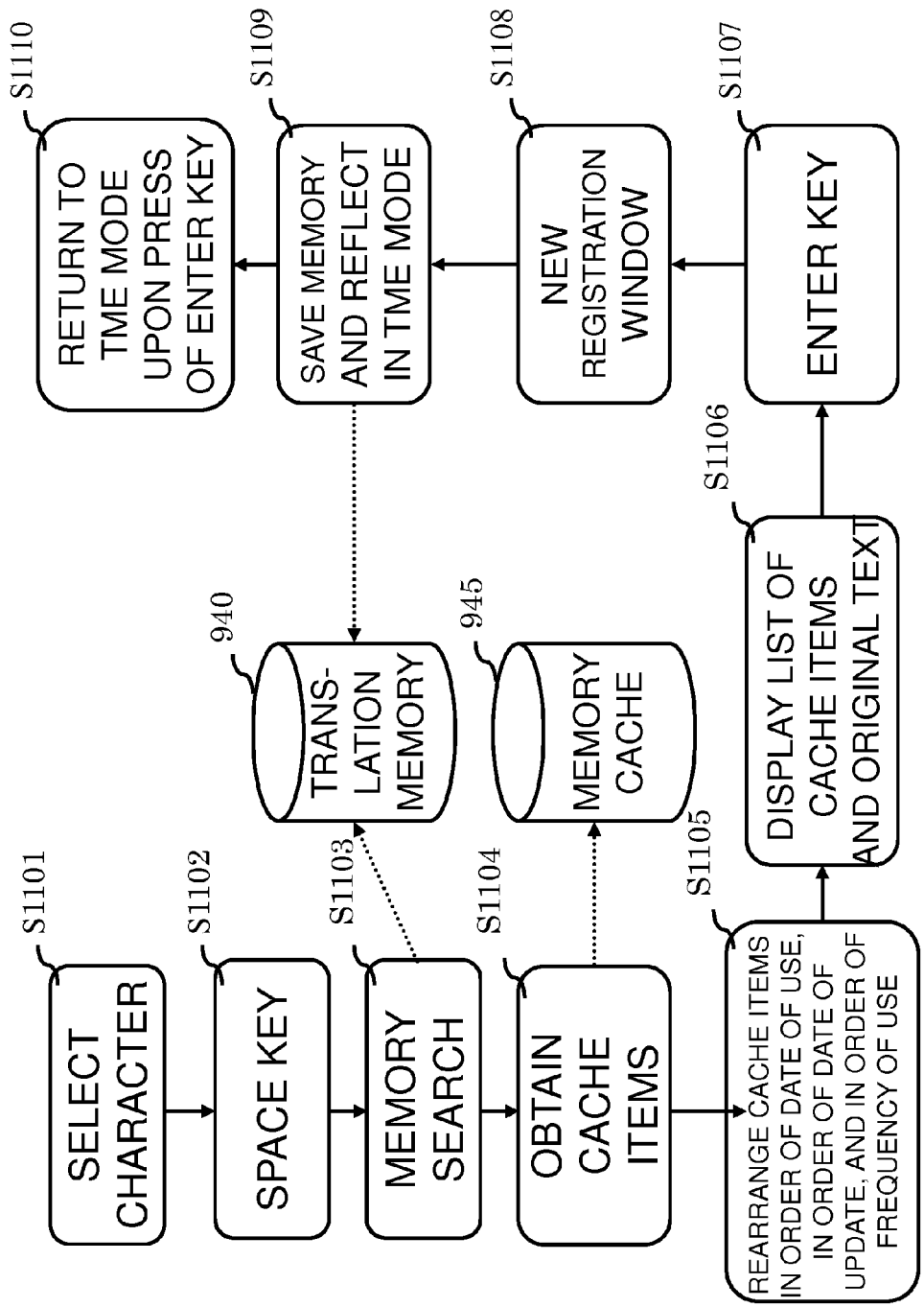
FIG. 11 is a flowchart illustrating details of a new registration processing (steps S608 and S629 in FIG. 6) in the TME mode.

FIG. 11 is a flowchart illustrating details of a new registration processing (steps S608 and S629 in FIG. 6) in the TME mode.

In step S1101, if the client A11 detects an operation of selecting a character in a particular range, the client A11 stores, in the work area of the RAM 23, information on the character in the selected range and that the character in the particular range is selected, and the process proceeds to step S1102.

In step S1102, if the client A11 detects a press of the space key, the client A11 sends the operation information stored in the work area of the RAM 23 to the management server 15, and the process proceeds to step S1103. In step S1103, the management server 15 searches the translation memory 940 using the received character in the selected range as a key, and the process proceeds to step S1104. In step S1104, the search result is stored in a memory cache 945 in the work area of the RAM 23 as a cached item of the translation term candidates, and the process proceeds to step S1105.

In step S1105, the cached items stored in the memory cache 945 are sorted in order of the date of use, in order of the date of update, and then in order of the frequency of use, and the process proceeds to step S1106. In step S1106, if a press of the space key is detected, the sorted cached items are displayed in a drop-down list, and the process proceeds to step S1107. That is, new memory registration in the TME mode is performed by using the drop-down list that appears when the space key is pressed. In step S1107, if a press of the enter key is detected, the process proceeds to step S1108.

In step S1108, a new registration window is displayed, and an input of registration information is waited for. If a character is input, and a press of the enter key is detected, the process proceeds to step S1109. In step S1109, the registered translation term is saved in the translation memory 940 as the most recently used and updated translation term, and the registration result is reflected in the display screen in the TME mode (the display is updated with the input character). Then, the process proceeds to step S1110. In step S1110, if it is detected that the enter key is pressed again, the mode returns to the original TME mode, and the process ends. The newly registered term (translation term) is displayed at the top of the drop-down list until another translation term in the same original language is registered or another translation term is selected.

Figure 12:
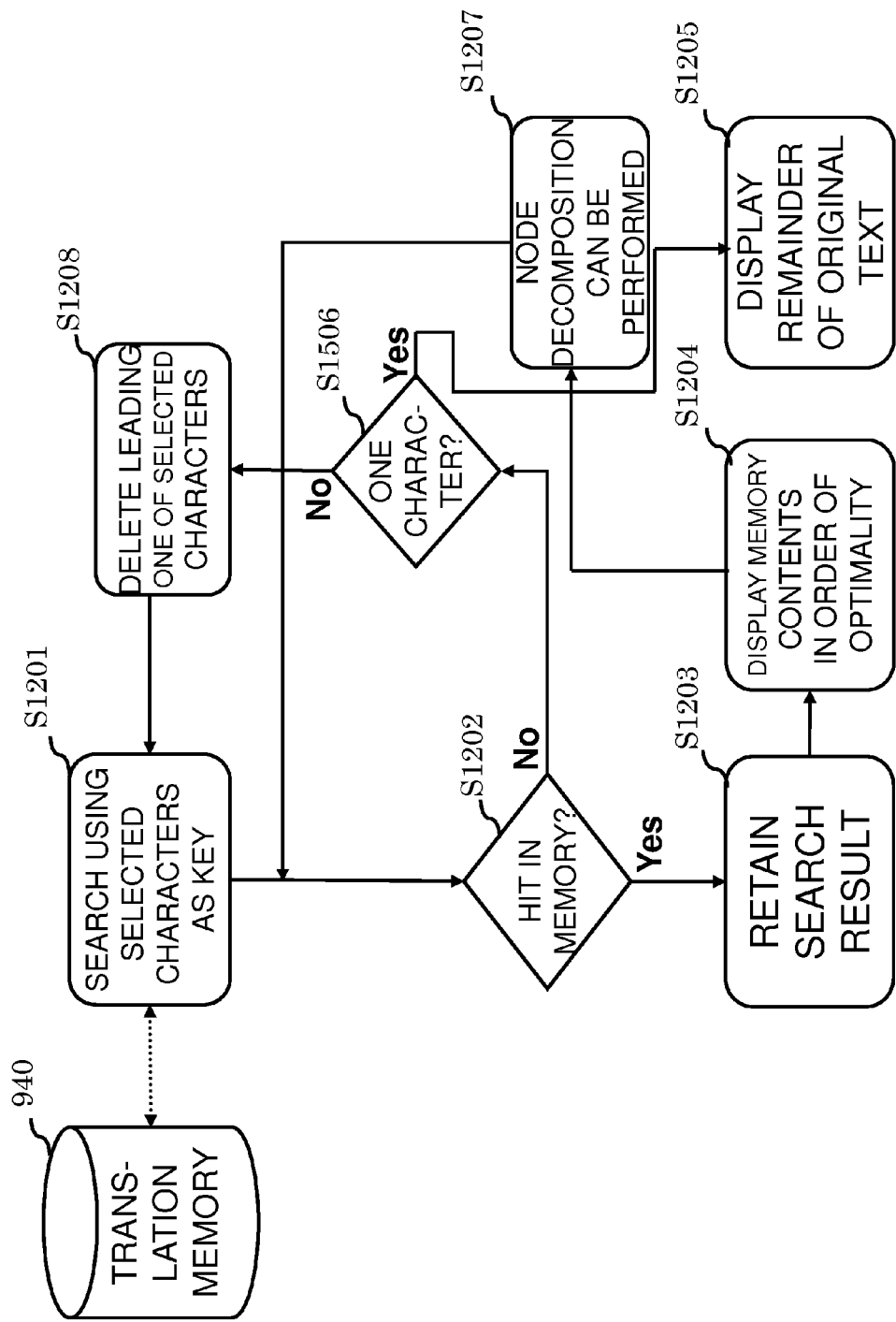
FIG. 12 is a flowchart illustrating details of a full longest match search processing in the search processing in step S626 in FIG. 6.

FIG. 12 is a flowchart illustrating details of a full longest match search processing that corresponds to step S626 in FIG. 6 (step S726 in FIG. 7).

First, in step S1201, the translation memory 940 is searched by using characters in the selected range stored in the work area of the RAM 23 as a key, and the process proceeds to step S1202. In step S1202, it is determined whether or not a translation term corresponding to the characters in the selected range is stored in the translation memory 940. If a corresponding translation term is stored, the process proceeds to step S1203. If no corresponding translation term is stored, the process proceeds to step S1506.

In step S1203, the characters in the selected range and the hit translation terms (all the matching translation terms) are separately stored in the work area of the RAM 23, and the process proceeds to step S1204. In step S1204, if there is a plurality of translation terms stored, the translation terms are sorted in order of the date of use, in order of the date of update, and then in order of the frequency of use (sorted in order of the optimality), information on the sorted translation terms is sent to the client, and the process proceeds to step S1207. In step S1207, the part of the characters in the selected range that does not match to any items in the translation memory is designated as a new character string in the selected range, the new character string is stored in the work area of the RAM 23, and the process proceeds to step S1202.

Such a state where a part of a character string is replaced with a translation term and the other part remains in the original language is referred to as node decomposition. For example, if the original character string is "a typical", and the memory stores "typical" and "Tennkei-teki", the "typical" is replaced with "Tennkei-teki", resulting in a character string "a Tennkei-teki". The term "node decomposition" refers to this state where the original character string is decomposed into two nodes "a" and "Tennkei-teki".

If it is determined in step S1202 that no corresponding translation term is stored, the process proceeds to step S1506. In step S1506, it is determined that the number of characters in the selected range stored in the work area of the RAM 23 is one. If the number of characters is one, the process proceeds to step S1205. If the number of characters is not one, the process proceeds to step S1208. That is, a criterion for ending the search is that the character string cannot be further divided.

In step S1205, if the search character string extends over two words, the part of the original text that remains in the original language after the node decomposition is displayed without change, and the process ends. If it is determined in step S1506 that the number of characters in the selected range is not one, the process proceeds to step S1208. In step S1208, the string of the characters in the selected range stored in the work area of the RAM 23 is reduced by one from the front thereof (specifically, the leading one character is deleted), and the process returns to step S1201.

Another Embodiment 1

The present invention described above with reference to a specific embodiment includes not only a case where the control program shown in the flowcharts of FIGS. 6 to 12 that controls the management server 15 and each client is supplied to the management server 15 and each client via a storage medium or a communication medium with communication line and implemented thereby but also a case where the control program is implemented by a single personal computer or a terminal. The present invention further includes a controlling method in which the management server 15 and each client or a single personal computer (PC) implements the controlling steps shown in the flowcharts. The present invention further includes a case where a computer-readable storage medium that stores the controlling program is read by the management server 15 and each client or a single personal computer (PC) and the controlling program is executed. The present invention also includes such a computer-readable storage medium that stores the controlling program.

Another Embodiment 2

In the embodiment described above, the part highlighted in reverse video by pressing and holding the left button of the mouse, dragging the mouse in the right direction (in the downward direction if the original text is written vertically) and releasing the left button is the selected range (scope), the full longest match search is performed for the selected range, and one or more relevant translation terms is displayed in the drop-down list (if there is no match, the word or phrase in the selected range of the original text is displayed).

Each time the selected range is expanded, the full longest match search is performed, and the translation term candidates displayed in the drop-down list are updated. Alternatively, however, the translation term candidates may be displayed in a cumulative manner. That is, all the translation terms found in the longest match search performed at every end point of the dragging operation may be stored in the work area of the RAM 23 and displayed in one drop-down list.

In this case, if the cursor is dragged and a translation term candidate A and a translation term candidate B are found in the longest match search performed at a cursor point (1), and then dragging of the cursor is resumed and a translation term candidate C and a translation term candidate D are found in the longest match search performed at a cursor point (2), the translation term candidates C and D, and the translation term candidates A and B are displayed in the drop-down list. In this example, the translation term candidates C and D found in the latter search are displayed above the translation term candidates A and B found in the former search (the translation term candidates are read from the work area of the RAM 23 in reverse order). Of course, the translation term candidates A and B may be displayed above the translation term candidates C and D. The translation term candidates A to D may be single words or compound words (including a phrase or a clause).

Another Embodiment 3

Translation term candidates found in the forward longest match search starting at the initially selected point of the scope of the selected range (the range highlighted in reverse video) are stored in the work area of the RAM 23, and a plurality of translation term candidates are displayed in the drop-down list (one translation term candidate is displayed at first, and the number of translation term candidates displayed increases as the selected range is expanded). The total number of translation term candidates displayed is set at 40 (that is, the drop-down list contains 40 rows). A translation term candidate newly found when the selected range is expanded to the right is displayed at the top of the drop-down list, and the old translation term candidate that has dropped out of the top 40 is unlisted. The number of translation term candidates that is set at 40 in this example can be changed within a predetermined range (up to 100, for example), and the set value is stored as a part of the setting information file in the client application folder in the hard disk 28 of each client.

Another Embodiment 4

Each time the selected range is expanded, the full longest match search is performed, and the translation term candidates displayed in the drop-down list are updated. Alternatively, however, the memory search is performed again at a time when the selected range is specified (as the mouse moves during the dragging operation, for example). For example, after the left button of the mouse is pressed at a particular point in the original text to specify the starting point of the selected range, and then the mouse is dragged in the right direction, the memory search may be performed again when the mouse being dragged is stopped for a predetermined time (0.5 seconds or longer, for example), and the found translation term candidates may be displayed. More specifically, there may be additionally provided a step of detecting the cursor position during the dragging operation of the mouse, and determining that the mouse is stopped if the cursor position is not changed for a predetermined time or is changed only by a predetermined amount or less (for example, the X coordinate and the Y coordinate are changed by 5 or less), and the memory search may be performed only when it is determined that the mouse is stopped. In this case again, only the translation term candidates found in the last memory search may be displayed in the drop-down list, or all the translation terms found in the longest match search performed every end point of the dragging operation may be stored in the work area of the RAM 23 and displayed in the drop-down list. The predetermined time and the predetermined values of the change of the coordinates are also stored as a part of the setting information file in the client application folder in the hard disk 28.

INDUSTRIAL APPLICABILITY

The translation assistance device according to the present invention is a useful translation assistance device that can efficiently make a translation since the translation assistance device can search for one or more translation term candidate corresponding to a word or phrase in a selected range of an original text and display a plurality of translation term candidates.

REFERENCE SIGNS LIST 10 network
11 client A
12 client B
13 client C
15 management server
16 shared memory
17 translation project
20 system bus
21 CPU
22 ROM
23 RAM
24 VGA
25 LAN adapter
26 keyboard
27 mouse
28 HDD
29 DVD-ROM drive
31 graphical user interface
32 runtime
33 component
34 OS
35 hardware

The invention claimed is:

1. A translation assistance device, comprising:
dictionary means that stores dictionary data including at least a word or phrase in a particular language and a word or phrase in another language that corresponds to the word or phrase in the particular language;
specifying means that specifies, on a character basis, a selected range for a word or phrase to be searched for in a document including the word or phrase to be searched for;
searching means that, each time said specified selected range specified on a character basis is changed, performs a full longest match search of said dictionary data for a word or phrase included in the changed selected range without needing another operation; and
display controlling means that displays a translation term candidate that is a word or phrase in the another language that is found in said full longest match search,
wherein said searching means searches said dictionary means for a full string of characters in the selected range, and
if said search proves that there is a matching translation term candidates in said dictionary means, said display controlling means displays the matching translation term candidate found in the full longest match search of the changed selected range as the selected range is changed, and
if said search proves there is no matching translation term candidate in said dictionary means, said searching means shortens the string of characters in said selected range on a one character by one character basis from the front thereof and further searches said dictionary means, and if the search for the shortened string of characters in said selected range proves that there is a matching translation term candidate in said dictionary means, said display controlling means displays the matching translation term candidate found in the search for the shortened string of characters in said selected range.

2. The translation assistance device according to claim 1, wherein said dictionary means stores a displayed translation term candidate selected as a translation term in association with the date and time when the translation term candidate is selected as a translation term,
said searching means reads, from said dictionary means, said translation term and the date and time when said translation term is selected, and
said display controlling means displays translation term candidates found in said full longest match search in order of the date and time of selection as a translation term with the latest selected translation term candidate displayed first.

3. A translation assistance system in which a server and a client are capable of communicating with each other via a network, the translation assistance system comprising:
dictionary means that stores dictionary data including at least a word or phrase in a particular language and a word or phrase in another language that corresponds to the word or phrase in the particular language;
specifying means that specifies, on a character basis, a selected range for a word or phrase to be searched for in a document including the word or phrase to be searched for;
searching means that, each time said specified selected range specified on a character basis is changed, performs a full longest match search of said dictionary data for a word or phrase included in the changed selected range without needing another operation; and
display controlling means that displays a translation term candidate that is a word or phrase in the another language that is found in said full longest match search,
wherein said searching means searches said dictionary means for a full string of characters in the selected range, and
if said search proves that there is a matching translation term candidates in said dictionary means, said display controlling means displays the matching translation term candidate found in the full longest match search of the changed selected range as the selected range is changed, and
if said search proves there is no matching translation term candidate in said dictionary means, said searching means shortens the string of characters in said selected range on a one character by one character basis from the front thereof and further searches said dictionary means, and if the search for the shortened string of characters in said selected range proves that there is a matching translation term candidate in said dictionary means, said display controlling means displays the matching translation term candidate found in the search for the shortened string of characters in said selected range.

4. The translation assistance system according to claim 3, wherein said dictionary means stores a displayed translation term candidate selected as a translation term in association with the date and time when the translation term candidate is selected as a translation term, said searching means reads, from said dictionary means, said translation term and the date and time when said translation term is selected, and said display controlling means displays translation term candidates found in said full longest match search in order of the date and time of selection as a translation term with the latest selected translation term candidate displayed first.

5. A control method for a translation assistance system in which a server and a client are capable of communicating with each other via a network, wherein the control method for the translation assistance system comprises:

dictionary means that stores dictionary data including at least a word or phrase in a particular language and a word or phrase in another language that corresponds to the word or phrase in the particular language, the control method comprising steps of:

specifying step that specifies, on a character basis, a selected range for a word or phrase to be searched for in a document including the word or phrase to be searched for;

searching step that, each time said specified selected range specified on a character basis is changed, performs a full longest match search of said dictionary data for a word or phrase included in the changed selected range without needing another operation; and display controlling step that displays a translation term candidate that is a word or phrase in the another language that is found in said full longest match search, wherein said searching step further searches said dictionary means for a full string of characters in the selected range, and if said search proves that there are one or more matching translation term candidates in said dictionary means, said display controlling step displays the matching translation term candidate(s) found in the full longest match search of the changed selected range as the selected range is changed, and if said search proves there is no matching translation term candidate in said dictionary means, said searching step further shorten the string of characters in said selected range on a one character by one character basis from the front thereof, and if the search for the shortened string of characters in said selected range proves that there are one or more matching translation term candidates in said dictionary means, said display controlling step further displays the matching translation term candidate(s) found in the search for the shortened string of characters in said selected range.

* * * * *